Figure 1:
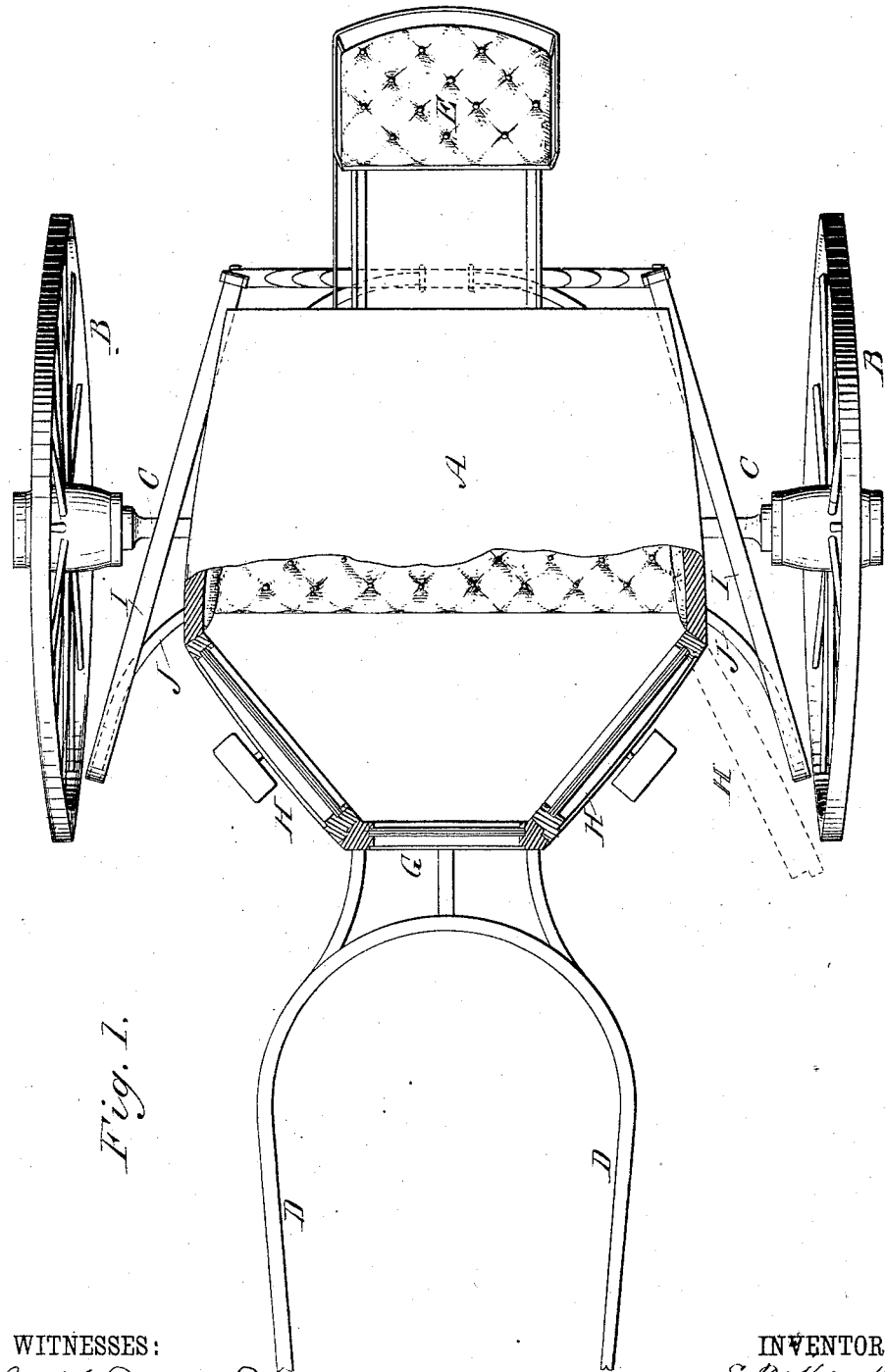

(No Model.) 2 Sheets—Sheet 1.

E. P. HINCKS & G. H. JOHNSON.
TWO WHEELED VEHICLE.

No. 305,187. Patented Sept. 16, 1884.

WITNESSES:
Johnet C. Deemer
C. Sedgwick

INVENTOR:
E. P. Hincks
G. H. Johnson
BY
Munn & Co.
ATTORNEYS.

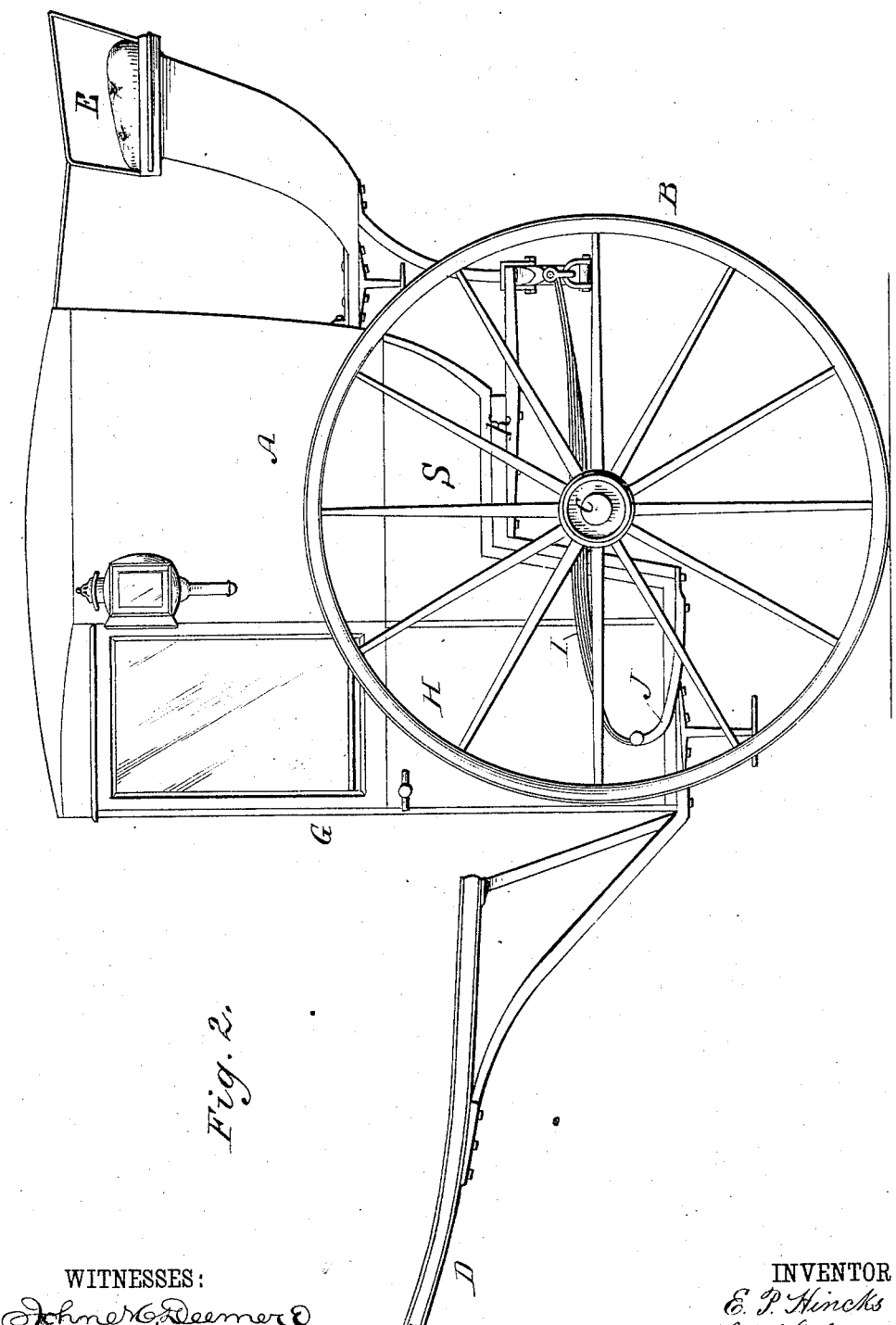

UNITED STATES PATENT OFFICE.

ENOCH P. HINCKS AND GEORGE H. JOHNSON, OF BRIDGEPORT, CONN.

TWO-WHEELED VEHICLE.

SPECIFICATION forming part of Letters Patent No. 305,187, dated September 16, 1884.

Application filed May 8, 1884. (No model.)

*To all whom it may concern:*

Be it known that we, ENOCH P. HINCKS and GEORGE H. JOHNSON, both of Bridgeport, in the county of Fairfield and State of Connecticut, have invented certain new and useful Improvements in Two-Wheeled Carriages, of which the following is a full, clear, and exact description.

This invention relates to two-wheeled coupés or carriages which present a projecting front, composed in part of opposite side doors, the driver's seat being in the rear of the vehicle. It is not designed, however, that our improved carriage should present a bow or curved front in horizontal section, but that it should present a three-sided figure—that is, a center fixed straight or approximately straight face and straight or nearly straight opposite side doors, arranged, when closed, to diverge in a backward direction. The side doors, which form two sides of this front, open, as in the case of other two-wheeled carriages having a three-sided front, toward the wheels of the vehicle, and the side springs, on which the body of the vehicle rests, are so arranged obliquely to the axle, diverging in a forward direction toward the front of the vehicle and into close proximity with the front of the wheels, as to admit of extended springs being used, and of the front side doors being readily opened wide without interfering with said springs, that extend beyond the hinges of the doors to near the front of the wheels, and are supported at their forward ends by goose-necks attached to the rocker-frame of the carriage. By this construction, and by arranging the axle of the carriage beneath the advance portion of the occupant's seat, a very convenient, easy-riding, and balanced carriage is obtained when the driver's seat is arranged, as described, in the rear.

Reference is to be had to the accompanying drawings, forming part of this specification, in which similar letters of reference indicate corresponding parts in both the figures.

Figure 1 represents a side view of a two-wheeled carriage embodying our invention, and Fig. 2 a partially sectional top or plan view of the same.

A indicates the main portion of the body of the carriage; B B, its wheels; C, its axle; D, its shafts, and E the driver's seat in the rear. S is the occupant's seat, beneath the advance portion of which the axle C is arranged. The forwardly-projecting front portion of the body is composed of a center fixed straight or approximately straight upper glazed face or panel-piece, G, and two oppositely-arranged upper glazed side doors, H H, also straight or approximately straight in horizontal section, and arranged, when closed, to diverge in a backward direction, thus forming three sides for the front of the vehicle-body, but not necessarily equal sides, the face or front piece, G, preferably being the narrowest. The doors H H open toward the wheels of the vehicle, as shown by dotted lines for one of them in Fig. 2, and by making them straight or approximately straight or flat more room is afforded for the opening of them without interfering with the wheels or with the side springs, I I, of the vehicle. To better provide for the opening of the doors without interference with or by the side springs, I I, and to give an extended elastic support to the body, said springs are arranged to run obliquely across the axle, diverging in a forward direction from the rear of the vehicle and extending far out at their front ends toward the front of the wheels and in close proximity to them at said ends. The rear ends of these springs may be supported in the usual way; but their forward spread-out ends are supported by goose-neck J J, curved or bent so as not to interfere with the spring of the doors or ingress or egress of a person to and from the interior of the vehicle, and bolted at their back ends to the under side of the rocker-frame K of the carriage. This arrangement and support of the forwardly-extended oblique springs, coupled with the arrangement of the axle beneath the advance portion of the occupant's seat and the arrangement of the driver's seat in the rear, secures a very stable but elastic support of the body and balanced and easy-riding action of the carriage, and neither said springs nor their supporting goose-necks interfere with the wide opening of the angularly-arranged side doors in front. None of these features, however, do we claim separately.

Having thus described our invention, we claim as new and desire to secure by Letters Patent—

In a two-wheeled carriage having a three-sided front, two of the sides composing said front being doors hinged in the rear to open on or toward the wheels, the combination, with the opposite oblique front side doors, H H, of the forwardly-diverging side springs, I I, arranged to extend toward the front of the wheels B B of the carriage and into close proximity with said wheels, the rocker-frame K, with its attached goose-necks J J, supporting the forward ends of the springs in advance of the hinges of the doors, the occupant's seat S, the axle C, arranged under said seat, and the driver's seat E in the rear of the carriage, all substantially as herein shown and described.

ENOCH P. HINCKS.
GEORGE H. JOHNSON.

Witnesses:
JOHN F. PLUMB,
JOHN E. POND.